United States Patent [19]

Page

[11] Patent Number: 4,503,532
[45] Date of Patent: Mar. 5, 1985

[54] MULTIPOINT FIBER OPTIC JUNCTION TERMINAL

[75] Inventor: Michel Page, Lon Guevil, Canada

[73] Assignee: The United States of America as represented by the Secretary of the Army, Washington, D.C.

[21] Appl. No.: 386,000

[22] Filed: Jun. 7, 1982

[51] Int. Cl.³ .............................................. H04B 9/00
[52] U.S. Cl. ......................................... 370/1; 179/37; 455/607
[58] Field of Search .................. 370/1, 3, 4; 455/606, 455/607; 179/37

[56] References Cited

U.S. PATENT DOCUMENTS 4,135,063  1/1979  Bosen ..................................... 179/37
4,166,212  8/1979  Judeinstein ............................. 370/4

OTHER PUBLICATIONS

Jaeger-A Designers Look Into Fiber Optic Fabrication-Edn Magazine, vol. 22, No. 2, pp. 54-60, Jan. 20, 1977.

Gray et al., "A Multiservice System" Ntg Fachber vol. 73, 1980 pp. 119-124.

Primary Examiner—Joseph A. Orsino, Jr.
Attorney, Agent, or Firm—Anthony T. Lane; Robert P. Gibson; Saul Elbaum

[57] ABSTRACT

In an intercom system, electrical noise interference is alleviated by interconnecting the tranceivers and receivers with the control sets via fibre optic lines. Audio signals are applied to a multiplexer which drives an optical modulator. The output of the optical modulator feeds a fiber optic line. Conversely, optical signals are fed to an optical demodulator whose output feeds a demultiplexer. Audio outputs from the demultiplexers feed the receivers and tranceivers and control sets.

5 Claims, 5 Drawing Figures

MULTIPOINT FIBER OPTIC JUNCTION TERMINAL

The invention described herein may be manufactured, used or licensed by or for the government of the United States of America for governmental purposes without payment to me of any royalties therefor.

This invention relates to aircraft intercommunication (intercom) systems.

Aircraft and avionics systems face a hostile electromagnetic environment which presents numerous sources of electrical noise. Such noise can be produced by external radiation, induction on transmission lines, coupling between antennas, coupling by difference in ground potential, cross talk conduction among power supply lines and infection by transmitters and receivers.

Noise interference is especially serious at audio-frequencies as modulation on the power supply line (400 Hz) will immediately be picked up by the audio lines and amplified by the intercom system, rendering monitoring of audio frequencies difficult. Interference with communications among operators (pilot, navigator, flight engineers, etc.) is obviously a potential flight safety hazard.

This very important operational problem compounds the normal problem of intercom system maintenance since it requires maintenance actions to respond to operators grievances. However, in practice, it has been found that:

(a) there is a large difference between the number of malfunctions recorded during flight operations and bench test;

(b) this difference is much more important for the intercom system than for any other avionics system; and (c) the number of maintenance actions showing "no fault" found accounts for about 10% of the manhours expended.

The above factors are indicative of the noise and intermittent electromagnetic interference problem affecting aircraft intercom systems. It is clear that, both from flight operations and maintenance aspects, it would be of great benefit to resolve this problem.

In existing intercom systems, various corrective measures are resorted to to alleviate the problem of noise including shielding, grounding, conductors twisting, balancing and isolation transformers. All these techniques must, to achieve conclusive results, often be combined which makes for complexity, high cost and additional weight. As an indication of the magnitude of the problem, it might be noted that some aircraft installations have over a thousand feet of audio lines.

The number of wiring links required for the interconnection between the receivers and the transmitters to the control sets are repeated for each system. Thus, if there are M receivers and transmitters and N control sets, there are M×N interconnecting links. One can easily appreciate the disadvantages both in terms of weight and volume. Furthermore, the maintenance aspect suffers from such varied and diverse electrical aircraft wiring.

A review of a typical aircraft installation makes the potential drawbacks self evident. A VHF (Very High Frequency) communication system aircraft installation is typically as follows:

Following the VHF audio from the navigator's intercom control/monitor to the transceiver, a shielded wire goes through a panel assembly disconnect connector, a bracket assembly disconnect connector to a connector on a junction box (JB) to two terminal posts inside the JB, then to a connector on the JB which is wired to a connector on the JB through the JB out another connector to the control connector to a volume control, back out of the control through the same connector to the transceiver connector.

The path for the microphone audio "high" is equally complicated. It runs from the navigator intercom control box connector through shielded wire to the panel assembly disconnect to the bracket assembly disconnect to a connector on the JB to two terminal posts in the JB, then out of a connector on the JB to a connector on the JB, out of the JB to a connector on the transceiver.

There are two main reasons for taking the receiver and microphone audio signals to the junction box. They are:

(a) to distribute the signals to the other intercom control sets; and (b) to terminate to "load" these lines with a termination resistor.

All these wires, interconnectors and junction boxes are subject to noise sources.

The present invention provides a means of alleviating the above-described problem of electrical noise interference in an aircraft intercom system. Basically, in accordance with the present invention, the problem is avoided by replacing the existing aircraft audio lines wiring connections from the communication and navigation sets to the control sets of the intercom system by an interconnection system utilizing fiber optic lines. Fiber-optic lines are virtually immune to radio-frequency (R.F.) interference and are much lighter in weight than wires.

Thus, in accordance with a broad aspect of the invention, there is provided, in an aircraft intercom system having a plurality radio of transceivers, radio receivers and control sets, the improvement wherein audio signals from the radio transceivers and radio receivers to the control sets and audio signals from the control sets to the transceivers are multiplexed for transmission, converted to optical signals for transmission via fiber optic lines, demodulated back to audio signals and then distributed via demultiplexing means.

The optical signals may, of course, be in the infrared portion of the spectrum and the term "light" used herein includes infrared as well as visible light.

The invention will now be further described in conjunction with the accompanying drawings, in which.

Figure 1:
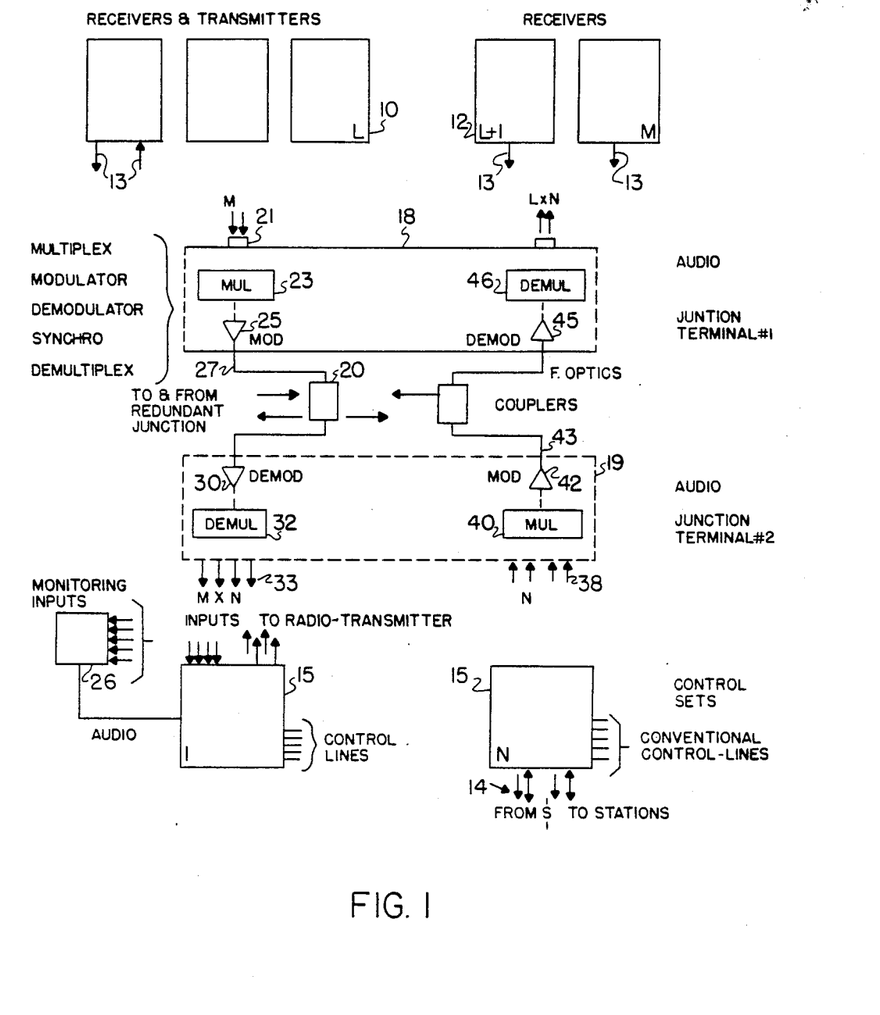
FIG. 1 is a simplified block diagram of the basic layout of a system according to the invention.

Turning now to FIG. 1, the basic system layout according to the invention is shown. The system is assumed to have L radio transmitters/receivers (transceivers) 10 and M-L radio receivers 12; i.e., the total number of radio receivers and radio transceivers is M. All the audio lines 13 from and to the radio transceivers 10 and from the radio receivers 12 and all the audio lines 14 to and from the intercom control sets 15 (N in number) are multiplexed and demultiplexed through two audio junction terminals 18 and 19. If redundant audio junction terminals are desired for reliability purposes, they can be coupled via optical couplers 20 known in the art, e.g. "access" or "star" type couplers. Light may be distributed into different distribution links to a number of terminals. In FIG. 1, light is shown conducted to four different junction terminals.

Audio signals from the M radio transceivers and radio receivers 10, 12 and fed into junction terminal 18 at connection means 21. The multiplexer 23 sequentially samples the inputs at 21 and drives an optical modulator 25 which produces an optical output on fiber-optic line 27. The signals on fiber-optic line 27 are received by the optical demodulator 30 in terminal 19 which produces an audio output which is distributed by demultiplexer 32 to its M×N output lines 33. These output lines 33 are connected as inputs to the N control sets 15. Any extra audio output lines can be connected to the monitor 26 as in any typical intercom.

The monitor, which is conventional and not directly related to the invention, is an integral part of aircraft avionics intercom systems. It provides for the junction of audio signals when the number of inputs is too large to be handled by the control sets. In FIG. 1 the inputs to the monitor are any extra audio output lines from the junction terminal. Audio lines can be selected one-by-one from the monitor by the operator (pilot, navigator ... ). The selected audio is sent to the control set.

The control sets are connected via lines 38 to junction terminal 19 where the lines are sequentially examined by a multiplexer 40 which feeds an optical modulator whose output on fiber optic line 43 is received by optical demodulator 45 in terminal 18. The demodulator 45 feeds a demultiplexer 46 which provides L×N outputs for the transceivers 10. That is, each of the N control set has to be connected to each of the L transmitters (in the transceivers) so L×N outputs are required from demultiplexer 46.

Junction terminals 18 and 19 perform the same functions, and are identical, except for the number of inputs and outputs. Therefore only one junction terminal is shown and described in detail herein.

Figure 2:
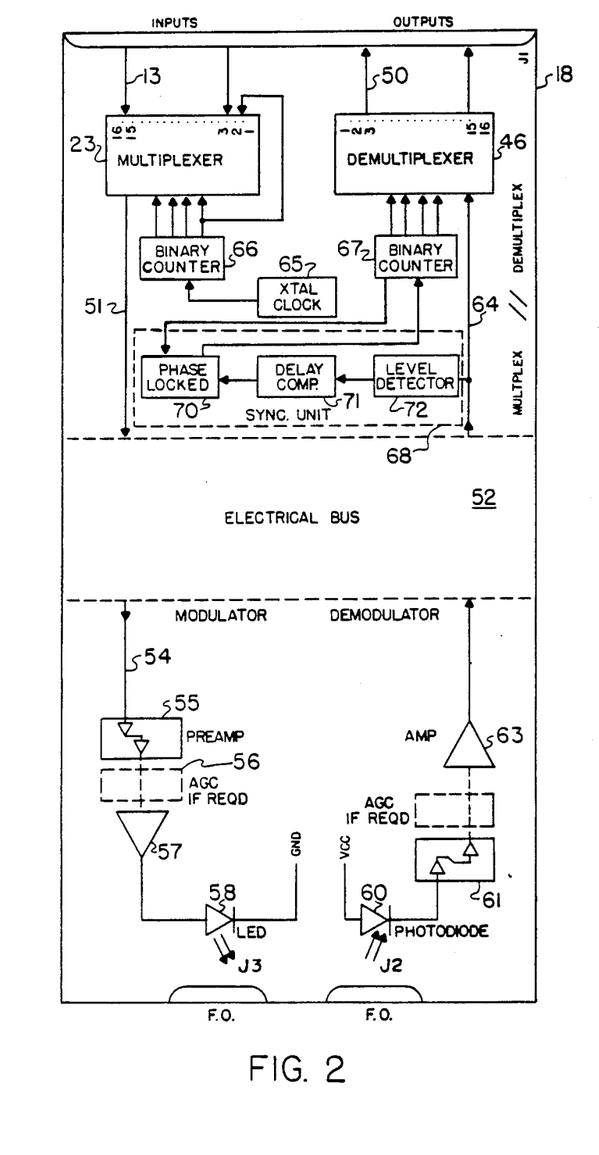
FIG. 2 is a block diagram showing the functional arrangement of a junction terminal used in the system of FIG. 1.

Turning now to FIG. 2, the layout of a junction terminal, e.g. terminal 18, is shown in more detail. Electrical inputs 13 to the multiplexer 23 are taken from electrical connector J1 (21). Similarly, the outputs 50 of the demultiplexer 46 are taken to the same electrical connector J1 (21), or a similar one (standard electrical connection). The output 51 of the multiplexer 23 is connected via electrical bus 52 to the input 54 of a preamp 55. The preamp 55 feeds an amplifier 57 via, if required, an AGC circuit 56. The amplifier 57 drives an optical modulator comprising, a light emitting diode (LED) 58 whose light output is coupled to an optical fiber (not shown) at optical connector J3.

Optical signals are received at optical junction J2 and detected by an optical demodulator comprising a photodiode 60. After preamplification at 61, AGC at 62, if required, and amplification at 63, the electrical signal passes via bus 52 and line 64 to the input of demultiplexer 46. Demultiplexer 46 directs the signals from line 64 to the appropriate output line 50.

The multiplexer 23 is controlled by a clock 65 and a binary counter 66, and the demultiplexer 46 is controlled by a binary counter 67 and sync. unit 68 (comprising phase locked loop 70, delay compensation circuit 71 and level detector 72) as will be discussed in more detail later. In the same manner, the multiplexer 40 is controlled by a clock 65' and a binary counter 66' (not shown), and the demultiplexer 32 is controlled by a sync. unit 68' and a binary counter 67' (not shown).

Figure 3:
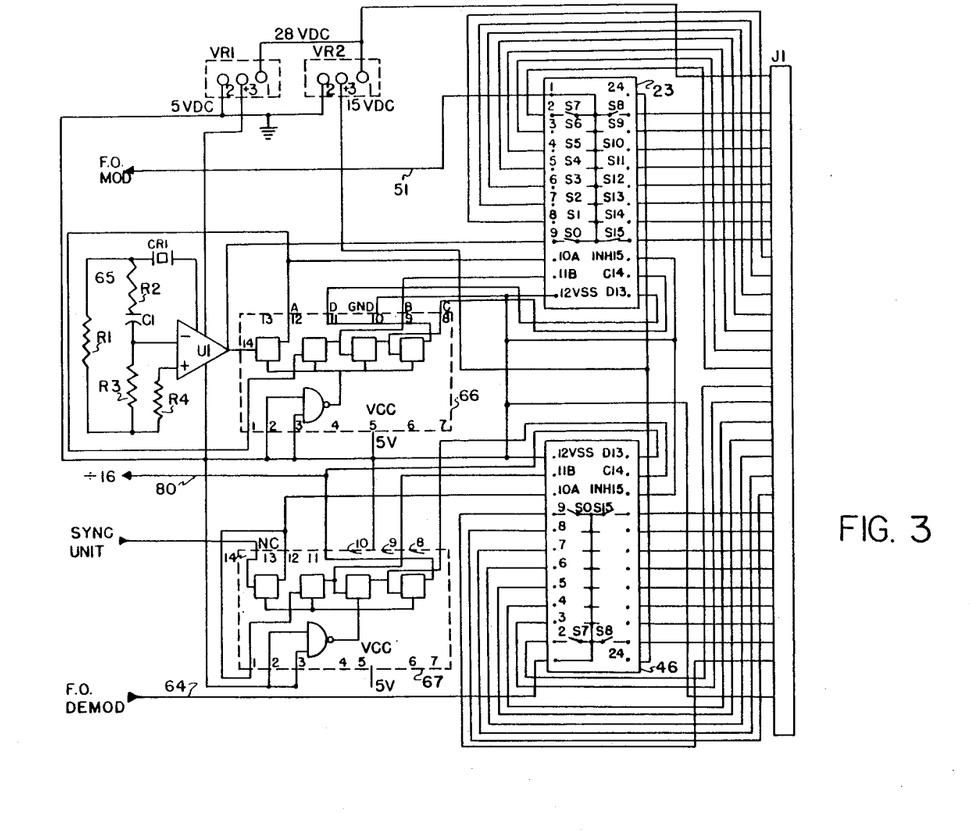
FIG. 3 is a partly block, partly schematic diagram of a multiplex/demultiplex unit as used in the terminal shown in FIG. 2.

FIG. 3 is a more detailed diagram of the multiplex/-demultiplex unit. Power supply, ground and all audio inputs and outputs go through the connector J1. Analog audio signals, typically from 2 to 7 volts and of 100 to 150 mW, are the inputs to channels S1 to S15 of the multiplexer 23. The switching from one channel to the next is controlled by a binary counter 66, which divides a reference pulse given by the crystal oscillator clock 65. The output 51 of the multiplexer 23 is sent to the optical modulator 25 which will be later described in connection with FIG. 5.

The input 64 to the demultiplexer 46 is the demodulated optical signal received from the optical demodulator 42 to also be discussed in connection with FIG. 5. See also FIG. 2. Switching of the demultiplexer 46 from one channel to the next is controlled by the binary counter 67, which divides a reference pulse received from the synchronization unit, to be discussed in detail in connection with FIG. 4. The required D.C. voltage for all units is obtained from voltage regulators VR1 and VR2.

The crystal clock is conventional and here comprises a 1 MHz crystal CR1, resistors R1-R4, capacitor C1 and amplifier U1.

The binary dividers 66 and 67 are of similar construction including four stages connected as shown.

Pin 9 of multiplexer 23 is used as the synchronization input from the master clock oscillator 65. This input is sent through the line 27 and will be detected by the synchronization unit 68' of the next junction terminal 19. In the same manner, a synchronization signal from the multiplexer 40 of the junction terminal 19 is sent through the line 43 and detected by the synchronization unit 68 of the junction terminal 18.

The multiplexer and demultiplexer may be integrated circuits. Pins 10-11, D13, C14 and 1NH15 are the same for multiplexer 23 and demultiplexer 46 and are used by the logic structure of the integrated circuits. Pin 12 is connected to ground.

Suitable multiplexers/demultiplexers may comprise COS/MOS type CD 4067 integrated circuits.

Figure 4:
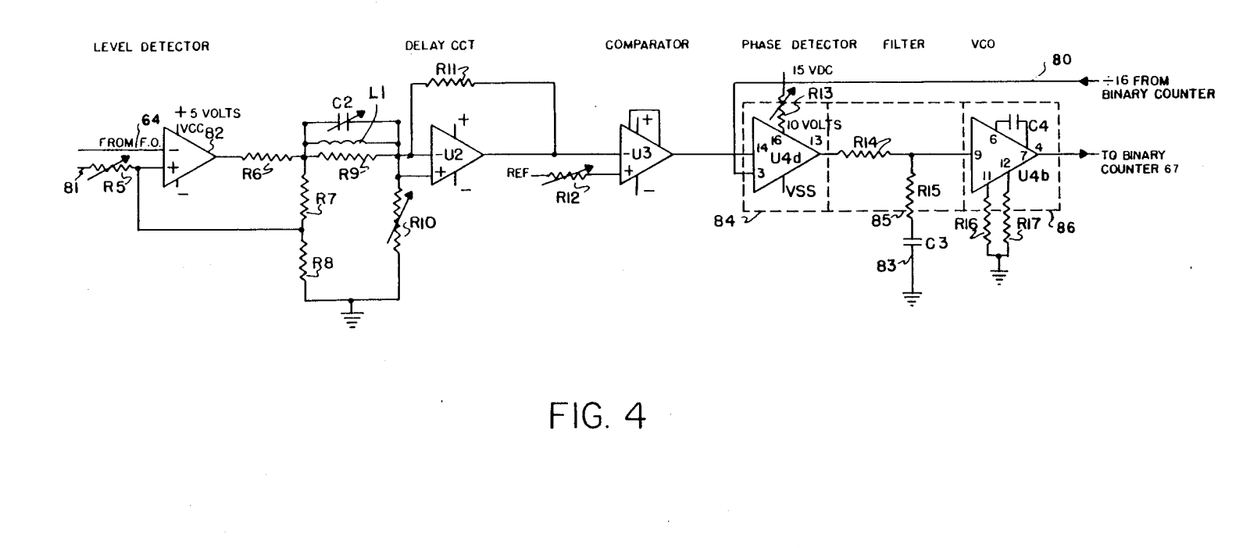
FIG. 4 is a schematic diagram of a synchronization unit as used in the terminal shown in FIG. 2.

Line 80 from pin 11 of counter 67 provides pulses at 1/16th the clock rate for use by the synchronization unit, FIG. 4.

Referring to FIG. 4, the synchronization unit receives pulses from the optical demodulator on line 64 for comparison with a reference voltage, on line 81, applied via resistor R5 to the non-inverting input of level detector 82, line 64 being connected to the inverting input. The delay equalization circuit (C2, R9, R10, L1, U2, R11) makes compensation for phase propagation delays both over the transmission line and the integrated circuits. It is followed by a comparator, U3 controlled by R12, which reestablishes, if required, the original shape of the clock pulse. Finally a phase locked loop circuit 83, comprising a phase detector 84, a filter 85 and a voltage controlled oscillator 86, whose characteristics are controlled by R13, R14, R15, R16, R17, C3 and C4, ensures final synchronization of the signal.

Figure 5:
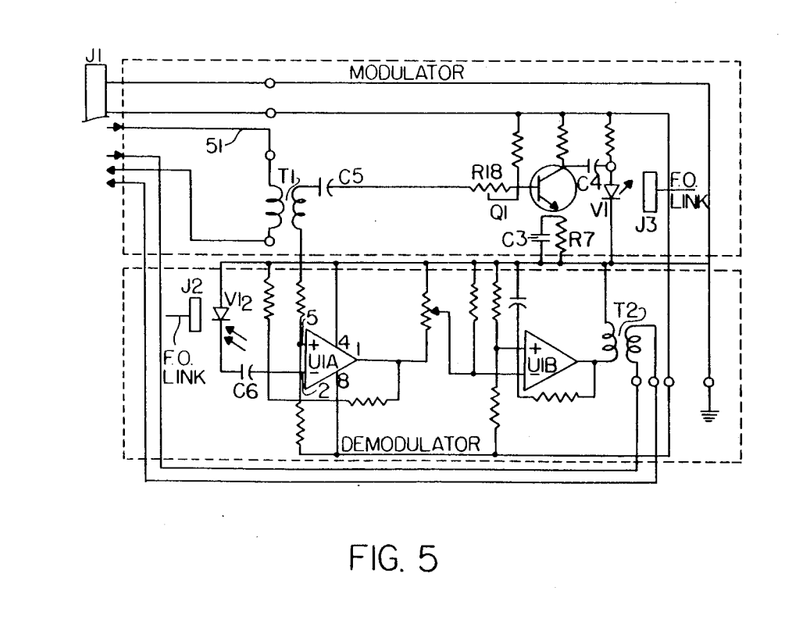
FIG. 5 is a schematic diagram of a modulator/demodulator as used in the terminal shown in FIG. 2.

FIG. 5 illustrates a simple light emitting diode modulator and a photodiode detector demodulator used to optically process the multiplexed signals in between the junction terminals. The modulator and demodulator could also be of integrated circuit types. The multiplexed signal on line 51 is fed via transformer T1, capacitor C5 and variable resistor R18 to the base of transistor Q1. Transistor Q1 drives the light emitting diode V1, whose light output is coupled to the fiber optic link by optical coupler J3.

The photodiode $V1_2$ of the demodulator receives light from optical coupler J2. The electrical output of $V1_2$, passing through capacitor C6, is amplified by amplifiers U1A and U1B (and associated resistors and capacitors) and then sent, through transformer T2, to the demultiplexer unit.

As mentioned above, the multiplexers/demultiplexers may comprise COS/MOS type CD 4067 integrated circuits but of course other suitable circuits may be used if desired. A number of other components may also comprise integrated circuits and, without limiting the invention thereto in any way, the following examples have been found suitable:

FIG. 3

U1—LM149/LM349
66—SN5493J
67—SN5493J
23, 46—CD4067

FIG. 4

82—LM741LN
U2—UA 702DC/RC702
U3—NS3302L/SN2711
U4—MC140463AL

FIG. 5

U1—MLM149 or LM349

The intercom system according to the invention has a number of advantages, including the following:

(a) reduction of noise usually picked up by the audio transmission lines, relays and splices;
(b) reduction of crosstalk;
(c) reduction of the number of maintenance actions and noise problems;
(d) reduction of wiring weight and volume; and
(e) system flexibility and adaptability.

The reduction of noise makes the intercom system according to the invention more "airworthy".

The system is relatively simple and very adaptable to various types of aircraft intercom systems. System modifications are not required as the multi-point fiber-optic junction terminals will interface with any analog audio signal.

The fiber-optics junction terminal is relatively simple and eliminates the need to have a large number of aircraft electrical terminals and junction boxes. The simple module-unit design allows adaptation to specific systems or aircraft requirements.

Obviously, some modifications and variations in the system are possible in light of particular requirements. It is therefore to be understood that within the scope of the attached claims the invention may be practiced with some variations to the system specifically described.

What I claim is:

1. An aircraft intercom system comprising:
a plurality L of radio transmitters;
a plurality M of radio receivers;
a plurality N of intercom control sets;
first multiplexing means, having a plurality M of inputs connected to receive respective first audio signals from said radio receivers, for sampling said first audio signals and forming therefrom a first multiplexed signal including a first synchronization signal and said first audio signal samples;
first clocking means for controlling the operation of said first multiplexing means and generating said first synchronization signal;
first modulating means, connected to receive said first multiplexed signal, for converting said first multiplexed signal into a first optical signal;
a first fiber optic line, having one end coupled to receive said first optical signal;
first demodulating means, coupled to an opposite end of said first fiber optic line to receive said first optical signal, for converting said first optical signal back into said first multiplexed signal;
first demultiplexing means, connected to receive said first multiplexed signal from said first demodulating means and including a plurality M×N of audio outputs connected to said control sets, for converting said first multiplexed signal back into said first audio signals to allow each first audio to be supplied to each control set;
first synchronizing means for detecting said first synchronization signal and controlling the operation of said first demultiplexing means in synchronism with the operation of said first multiplexing means;
second multiplexing means, having a plurality N of inputs connected to receive respective second audio signals from said control sets, for sampling said second audio signals and forming therefrom a second multiplexed signal including a second synchronization signal and said second audio signal samples;
second clocking means for controlling the operation of said second multiplexing means and generating said second synchronization signal;
second modulating means, connected to receive said second multiplexed signal, for converting said second multiplexed signal into a second optical signal;
a second fiber optic line, having one end coupled to receive said second optical signal;
second demodulating means, coupled to an opposite end of said second fiber optic line to receive said second optical signal, for converting said second optical signal back into said second multiplexed signal;
second demultiplexing means, connected to receive said second multiplexed signal from said second demodulating means and including a plurality L×N of audio outputs connected to said radio transmitters, for converting said second multiplexed signal back into said second audio signals to allow each second audio signal to be supplied to each radio transmitter; and
second synchronizing means for detecting said second synchronization signal and controlling the operation of said second demultiplexing means in synchronism with the operation of said second multiplexing means.

2. An aircraft intercom system, as described in claim 1, which further comprises:
a first junction terminal, including said first multiplexing means, first clocking means, first modulating means, second demodulating means, second demultiplexing means, and second synchronizing means; and a second junction terminal, including said first demodulating means, first demultiplexing means, first synchronizing means, second multiplexing means, second clocking means, and second modulating means.

3. An aircraft intercom system, as described in claim 1, wherein each modulating means comprises a light emitting diode.

4. An aircraft intercom system, as described in claim 1, wherein each demodulating means comprises a photodiode.

5. An aircraft intercom system, as described in claim 1, wherein each radio transmitter is associated with one of said radio receivers to constitute a radio transceiver.

* * * * *

UNITED STATES PATENT AND TRADEMARK OFFICE
CERTIFICATE OF CORRECTION

PATENT NO. : 4,503,532

DATED : March 5, 1985

INVENTOR(S) : Michel Page

It is certified that error appears in the above-identified patent and that said Letters Patent is hereby corrected as shown below:

On the title page assignee should read

--(73) Assignee: Her Majesty the Queen, as represented by the Minister of National Defence of Her Majesty's Canadian Government. --

Signed and Sealed this

Twelfth Day of November 1985

[SEAL]

Attest:

DONALD J. QUIGG

Attesting Officer

Commissioner of Patents and Trademarks